2,925,417
QUINOLINIUM SALTS OF PAMOIC ACID

Edward F. Elslager and Donald F. Worth, St. Clair Shores, Mich., assignors to Parke, Davis & Company, Detroit, Mich., a corporation of Michigan No Drawing. Application November 6, 1957
Serial No. 694,720

8 Claims. (Cl. 260—240)

The present invention is concerned with quinolinium salts of pamoic acid, with methods for their manufacture, and with their employment in therapeutic applications.

More particularly, the present invention relates to salts comprising the 6-dimethylamino-2-[2-(2,5-dimethyl-1-phenyl-3-pyrryl)vinyl]-1-methylquinolinium cation (also known as the pyrvinium cation)

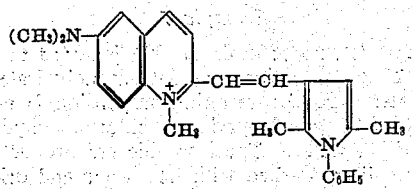

and an anion of pamoic acid, which is 2,2'-dihydroxy-1,1'-dinaphthylmethane-3,3'-dicarboxylic acid

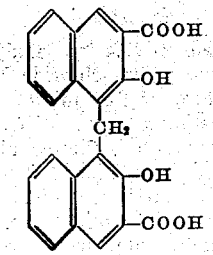

Pyrvinium chloride, a compound described in Example 7 of U.S. Patent 2,515,912, and other simple pyrvinium salts, are therapeutically useful as anthelmintic agents. They are effective against parasitic nematodes, including nematodes of the genera Enterobius (Oxyuris) and Stronglyloides. Such simple pyrvinium salts, however, have properties which restrict their use in pharmaceutical applications. They have an intensely bitter taste, and because of the high incidence of pinworm infestations in young children, for whom capsules and coated tablets are often impractical dosage forms, the simple pyrvinium salts, such as the chloride, are unsatisfactory for use in a high proportion of cases. Other disadvantages associated with the use of the simple pyrvinium salts are their tendency to produce nausea, their staining properties, and the side-effects which they produce.

It is an object of the present invention to provide pyrvinium salts of high anthelmintic activity, which salts are notably free of the disagreeable taste, tendency to produce nausea, staining properties, and side-reactions of the prior art compositions.

Such an object and other desirable results are achieved by providing salts comprising the pyrvinium cation and an anion of pamoic acid. Salts of this constitution are red in color, but are of a degree of water-insolubility sufficient to prevent or greatly minimize permanent staining.

In addition, they are essentially tasteless, so that they can be formulated into suspensions which are pharmaceutically acceptable for oral administration. Such pamoate salts exhibit a high specificity of action in the treatment of helminthiases and are markedly free of undesirable side effects.

Representative compounds of this invention are pyrvinium pamoate, wherein both of the carboxyl groups of pamoic acid participate in the salt formation, and pyrvinium acid pamoate, wherein only one of the carboxyl groups of pamoic acid participates in salt formation. The former compound is preferably made by treating approximately 2 molecular equivalents or formula weights of a soluble pyrvinium salt with 1 molecular equivalent or formula weight of a soluble salt of pamoic acid which is formed by neutralization of both of the carboxyl groups with a base. The same compound can be obtained when the same reactants are employed in different ratios. Pyrvinium acid pamoate is preferably made by treating 1 molecular equivalent of a soluble pyrvinium salt with 1 molecular equivalent of a soluble acid salt of pamoic acid, or with a reagent such as one comprising a disodium salt of pamoic acid and an equimolar quantity of a mineral acid. The term "soluble salt" is used herein in a relative sense, and means a degree of solubility substantially greater than that exhibited by pyrvinium pamoate or pyrvinium acid pamoate. Thus, sodium acid pamoate is a soluble salt by this definition, although it may actually appear as an insoluble phase in a particular reaction mixture.

Because pamoic acid is a tetrabasic acid containing two phenolic groups as well as two carboxyl groups, the use of such pamoate salts as the trisodium salt and the tetrasodium salt makes possible the formation of insoluble pyrvinium salts of pamoic acid having more than 2 molecular equivalents of the pyrvinium cation for each molecular equivalent of a pamoate anion. Such salts are also within the scope of this invention.

Pyrvinium salts of pamoic acid can also be made by the direct interaction of pamoic acid and a soluble pyrvinium salt in a neutral solvent.

Reactants suitable for carrying out the process of this invention can be selected from among pyrvinium chloride, bromide, iodide, perchlorate, thiocyanate, acetate, methylsulfate, benzenesulfonate, p-toluenesulfonate and other soluble pyrvinium salts; and from among sodium pamoate, potassium pamoate, ammonium pamoate, magnesium pamoate, simple amine salts of pamoic acid, corresponding acid salts such as sodium acid pamoate, reagents comprising pamoic acid and sufficient base to neutralize one or more of the acidic groups, other reagents comprising a soluble salt of pamoic acid and pamoic acid itself. In this disclosure a term such as sodium pamoate, not otherwise qualified, designates the disodium salt.

Suitable reaction media in which to carry out the salt formation are solvents in which the reactants are at least partially soluble, and which are relatively unreactive toward each of the reactants. Reaction media preferred because of satisfactory solvent properties, unreactivity and inexpensiveness are water and aqueous alkanols, although other satisfactory media can be selected from among a wide variety of solvents, particularly those which are neutral and polar. The salt formation proceeds immediately upon admixture of the reactants, although in many cases a high yield and a crystalline form conducive to rapid filtration are facilitated by heating the reaction mixture for up to about an hour and then chilling it.

The reaction product is isolated by direct filtration or centrifugation, or by filtration following concentration of the reaction mixture or dilution with a non-polar solvent or with water.

The pyrvinium pamoate and pyrvinium acid pamoate of this invention are compounds which retain the high activity of simple pyrvinium salts against nematodes, but which are essentially tasteless and which exhibit each of the desirable properties described elsewhere in this disclosure. For these reasons they are particularly suitable for use in such dosage forms as suspensions and uncoated tablets.

This invention will appear more fully from the examples which follow, wherein are illustrated various of the procedural modifications which can be successfully employed in the practice of this invention. The scope of the invention is not limited thereby, as many modifications in materials and methods will be apparent from this disclosure to those skilled in the art.

*Example 1*

A hot, filtered, water solution containing 12.2 g. of pyrvinium chloride dihydrate is added slowly with vigorous stirring to a solution of 6.0 g. of sodium pamoate monohydrate in hot water. While stirring is continued, the resulting red suspension is heated at about 90–100° C. for 1 hour. The insoluble product is collected on a filter and washed well with hot water. This compound is pyrvinium pamoate (a salt comprising 2 molecular equivalents of the pyrvinium cation to 1 molecular equivalent of the pamoate anion). The preparation obtained is commonly hydrated, although the anhydrous material is readily obtained by drying for up to 30 hours at about 75° C. in a vacuum. This compound melts over a range from about 200° C. and exhibits absorption maxima at about 236, 356 and 503 millimicrons.

By the foregoing procedure, with the substitution of 13.2 g. of pyrvinium iodide for the pyrvinium chloride dihydrate, and with the substitution of an aqueous solution of 5.0 g. of pamoic acid and 1.45 g. of potassium hydroxide for the aqueous solution of sodium pamoate monohydrate, the same pyrvinium pamoate is obtained.

*Example 2*

A hot, filtered solution of 2.27 g. of pyrvinium chloride dihydrate in 250 ml. of water is added slowly to a solution of 2.25 g. of sodium pamoate monohydrate in 50 ml. of water. A red precipitate immediately forms. The mixture is heated at about 90–100° C. for 5 minutes more and then filtered. The reaction product is washed with hot water and dried at about 75° C. in a vacuum. This preparation melts at about 210–215° C., with prior softening from about 190° C., and is substantially identical with the product of Example 1.

*Example 3*

A solution of 2.25 g. of sodium pamoate monohydrate in 50 ml. of hot water is added slowly, with stirring, to a hot, filtered solution of 2.27 g. of pyrvinium chloride dihydrate in 250 ml. of water. The precipitate which forms is collected directly on a filter, washed with hot water, and dried at 75° C. in a vacuum. It is pyrvinium pamoate, substantially identical with the products of Examples 1 and 2.

The same pyrvinium pamoate is obtained by the substitution of 2.8 g. of pyrvinium p-toluenesulfonate (prepared from 6-dimethylaminoquinaldine metho-p-toluenesulfonate and 2,5-dimethyl-1-phenyl-3-pyrrolecarboxaldehyde according to the process of U.S. Patent 2,515,912) for the pyrvinium chloride dihydrate in the foregoing procedure.

*Example 4*

Hydrochloric acid (50 ml., 0.1 N) is added to a hot, filtered solution of 2.27 g. of pyrvinium chloride dihydrate in 250 ml. of water. The resulting solution is then added slowly, with stirring, to a solution of 2.25 g. of sodium pamoate monohydrate in 250 ml. of water. After the mixture is heated for 5 minutes at about 90–100° C., the insoluble product is collected on a filter, washed with hot water and dried at about 75° C. in a vacuum. This compound melts at about 220–225° C. after prior softening from about 205° C., and is pyrvinium acid pamoate (a salt comprising 1 molecular equivalent of the pyrvinium cation to 1 molecular equivalent of the acid pamoate anion).

*Example 5*

Hydrochloric acid (50 ml., 0.1 N) is added slowly to a solution of 2.27 g. of sodium pamoate monohydrate in 50 ml. of water. The resulting suspension is added, with stirring, to a solution of 2.25 g. of pyrvinium chloride dihydrate in 250 ml. of hot water. The deep red, insoluble product is collected on a filter, washed with hot water and dried for 16 hours at about 75° C. in a vacuum. This compound is pyrvinium acid pamoate, substantially identical with the product of Example 4.

*Example 6*

To a stirred solution of 2.25 g. of pyrvinium chloride dihydrate in a hot mixture of 200 ml. of water and 50 ml. of 0.1 N hydrochloric acid is added a solution of 2.27 g. of sodium pamoate monohydrate in 50 ml. of water. The insoluble product is collected on a filter, washed with hot water and dried. It is pyrvinium acid pamoate, substantially identical with the products of Examples 4 and 5.

*Example 7*

Hydrochloric acid (50 ml., 0.1 N) is added to a solution of 2.27 g. of sodium pamoate monohydrate in 50 ml. of water. To the resulting suspension is added a solution of 2.25 g. of pyrvinium chloride dihydrate in 250 ml. of hot water. The insoluble red product is collected on a filter, washed with hot water and dried. It is pyrvinium acid pamoate, substantially identical with the products of Examples 4, 5 and 6.

*Example 8*

Pyrvinium chloride (499.4 g., analyzing for 3.7% water and 96.3% pyrvinium chloride by difference) is dissolved in a mixture of 920 ml. of water and 3680 ml. of ethanol by heating to about 60° C. with mechanical stirring. The hot solution is filtered and the filtrate is combined with washings totaling 230 ml. of water and 920 ml. of ethanol. To it is added, with continuous stirring over a period of 30 minutes, a filtered solution of 259.1 g. of sodium pamoate monohydrate in 3300 ml. of water. Stirring is continued for 30 minutes more, and the mixture is then cooled and refrigerated for complete separation of product. The red product is collected on a filter, washed with cold aqueous ethanol and dried. It is pyrvinium pamoate, substantially identical with the products of Examples 1, 2 and 3.

*Example 9*

A hot, filtered solution of 2.27 g. of pyrvinium chloride dihydrate in 50 ml. of methanol is added slowly to a stirred solution of 2.25 g. of sodium pamoate monohydrate in 50 ml. of methanol. The resulting red suspension is heated to boiling, cooled, and filtered from a small amount of insoluble material. The filtrate is poured into 200 ml. of ether, and the precipitated product is collected on a filter and dried. It is pyrvinium pamoate, substantially identical with the products of Examples 1, 2, 3 and 8.

*Example 10*

A hot, filtered solution of 2.27 g. of pyrvinium chloride dihydrate in 250 ml. of water is added slowly to a stirred solution of 0.56 g. of sodium pamoate monohydrate in 50 ml. of 0.05 N sodium hydroxide. The red, insoluble product is collected on a filter and dried at about 75° C. in a vacuum. This product is a pyrvinium salt of pamoic acid, and is shown by nitrogen analysis to contain approximately 3 molecular equivalents of the pyrvinium cation for each molecular equivalent of a pamoate anion.

Example 11

A solution of 1.12 g. of sodium pamoate monohydrate in 100 ml. of water is filtered into a solution of 8.5 ml. of concentrated hydrochloric acid in 50 ml. of water, and the precipitated pamoic acid is collected on a filter, washed with hot water, and dissolved in 60 ml. of pyridine. The pyridine solution (which contains a pyridine salt of pamoic acid) is clarified by filtration and added to a hot, aqueous solution of 2.27 g. of pyrvinium chloride. The red, insoluble product is collected on a filter, washed with hot water and dried. It is pyrvinium pamoate, substantially identical with the products of Examples 1, 2, 3, 8 and 9.

Example 12

A solution of 0.97 g. of pamoic acid in 200 ml. of boiling propylene glycol is added to a hot, stirred solution of 2.27 g. of pyrvinium chloride dihydrate in 50 ml. of propylene glycol. The resulting suspension is allowed to cool to about 90–95° C., diluted with 250 ml. of hot water, and filtered. The product collected is a red pyrvinium salt of pamoic acid.

Example 13

A solution of 0.97 g. of pamoic acid in 50 ml. of hot dimethylformamide is added slowly to a hot, stirred solution of 2.09 g. of pyrvinium chloride in 50 ml. of hot dimethylformamide. The resulting solution is cooled to about 100° C. and diluted with 120 ml. of hot water. The mixture is heated for an additional 5 minutes at about 100° C. and then filtered. The product collected is a red pyrvinium salt of pamoic acid.

Example 14

A pharmaceutically-acceptable suspension of pyrvinium pamoate for oral administration is prepared as follows:

List of ingredients:

| Ingredient | Unit | Amount |
|---|---|---|
| Benzoic acid | g | 1 |
| Propylene glycol | ml | 60 |
| Carbowax 1000 monostearate | g | 6 |
| Pyrvinium pamoate | g | 9 |
| Water | ml | 500 |
| Sucrose | g | 300 |
| Methyl cellulose (25 centipoises) | g | 7 |
| Imitation strawberry flavor | ml | 0.12 |

Water to make 1000 ml.

The sucrose and methyl cellulose are stirred with 350 ml. of water for about one hour, or until solution is complete.

The Carbowax 1000 monostearate and benzoic acid are melted in the propylene glycol. To this homogeneous solution is added the pyrvinium pamoate (as from Example 8). The latter compound is finely dispersed, and the mixture is stirred at 50–60° C. until a clear deep red solution results. The solution is slowly poured into about 500 ml. of water under vigorous stirring, producing a suspension of pyrvinium pamoate. This suspension is diluted immediately with the sucrose-methyl cellulose solution. Flavor is added, and the final volume is brought to 1000 ml. with water.

The Carbowax 1000 monostearate is the monostearoyl ester of a polyethylene glycol having an average molecular weight of about 1000. It is satisfactory to substitute for this material another higher fatty acid ester of a polyethylene glycol of comparable molecular weight. It is also satisfactory to substitute pyrvinium acid pamoate for the pyrvinium pamoate.

What is claimed is:

1. 6 - dimethylamino - 2 - [2 - (2,5 - dimethyl-1-phenly-3-pyrryl)vinyl]-1-methylquinolinium salt of 2,2'-dihydroxy-1,1'-dinaphthylmethane-3,3'-dicarboxylic acid.

2. 6 - dimethylamino - 2 - [2 - (2,5 - dimethyl-1-phenyl-3-pyrryl)vinyl]-1-methylquinolinium salt with one-half formula weight of 2,2'-dihydroxy-1,1'-dinaphthylmethane-3,3'-dicarboxylic acid anion.

3. 6 - dimethylamino-2-[2-(2,5-dimethyl - 1 - phenyl-3-pyrryl)vinyl]-1-methylquinolinium salt with one formula weight of 2,2'-dihydroxy-1,1'-dinaphthylmethane-3,3'-dicarboxylic acid anion.

4. A process for the manufacture of a 6-dimethylamino-2-[2-(2,5-dimethyl - 1 - phenyl - 3 - pyrryl)vinyl]-1-methylquinolinium salt of 2,2'-dihydroxy-1,1'-dinaphthylmethane-3,3'-dicarboxylic acid which comprises: mixing a soluble 6-dimethylamino-2-[2-(2,5-dimethyl-1-phenyl-3-pyrryl)vinyl]-1-methylquinolinium salt in an unreactive medium with a member of the class consisting of 2,2'-dihydroxy-1,1'-dinaphthylmethane-3,3'-dicarboxylic acid and soluble salts thereof and isolating the resulting product.

5. A process for the manufacture of a 6-dimethylamino-2-[2-(2,5-dimethyl - 1 - phenyl - 3 - pyrryl)vinyl]-1-methylquinolinium salt of 2,2'-dihydroxy-1,1'-dinaphthylmethane-3,3'-dicarboxylic acid which comprises: mixing a soluble 6-dimethylamino-2-[2-(2,5-dimethyl-1-phenyl-3-pyrryl)vinyl]-1-methylquinolinium salt in an unreactive medium with a soluble salt of 2,2'-dihydroxy-1,1'-dinaphthylmethane-3,3'-dicarboxylic acid and isolating the insoluble reaction product.

6. A process for the manufacture of a 6-dimethylamino-2-[2-(2,5-dimethyl - 1 - phenyl - 3 - pyrryl)vinyl]-1-methylquinolinium salt of 2,2'-dihydroxy-1,1'-dinaphthylmethane-3,3'-dicarboxylic acid which comprises: mixing a 6-dimethylamino-2-[2-(2,5-dimethyl - 1 - phenyl-3-pyrryl)vinyl]-1-methylquinolinium halide with an alkali metal salt of 2,2'-dihydroxy-1,1'-dinaphthylmethane-3,3'-dicarboxylic acid in an aqueous solvent and isolating the insoluble reaction product.

7. A process for the manufacture of 6-dimethylamino-2-[2-(2,5-dimethyl-1-phenyl - 3 - pyrryl)vinyl]-1-methylquinolinium salt with one-half formula weight of 2,2'-dihydroxy - 1,1' - dinaphthylmethane-3,3'-dicarboxylic acid anion which comprises: mixing 6-dimethylamino-2[2-(2,5-dimethyl-1-phenyl - 3 - pyrryl)vinyl]-1-methylquinolinium chloride with alkali metal 2,2'-dihydroxy-1,1'-dinaphthylmethane-3,3'-dicarboxylate in an aqueous solvent and isolating the insoluble reaction product.

8. A process for the manufacture of 6-dimethylamino-2-[2-(2,5-dimethyl-1-phenyl - 3 - pyrryl)vinyl]-1-methylquinolinium salt with one-half formula weight of 2,2'-dihydroxy-1,1'-dinaphthylmethane-3,3'-dicarboxylic acid anion which comprises: mixing 6-dimethylamino-2-[2-(2,5 - dimethyl - 1 - phenyl - 3 - pyrryl)vinyl]-1-methylquinolinium chloride with sodium 2,2'-dihydroxy-1,1'-dinaphthylmethane-3,3'-dicarboxylate in an aqueous alkanol and isolating the insoluble reaction product.

References Cited in the file of this patent

UNITED STATES PATENTS

| Number | Name | Date |
|---|---|---|
| 1,872,826 | Schulemann et al. | Aug. 23, 1932 |
| 2,515,905 | Sprague et al. | July 18, 1950 |
| 2,515,912 | Van Lare et al. | July 18, 1950 |
| 2,715,622 | Gerzon et al. | Aug. 16, 1955 |

OTHER REFERENCES

Campbell: Journal of the American Chemical Society, vol. 68, pp. 1841–1842 (1946).